United States Patent [19]

Burgdorf et al.

[11] Patent Number: 4,900,105

[45] Date of Patent: Feb. 13, 1990

[54] PRESSURE FLUID-ACTIVATED BRAKE SYSTEM INCLUDING AN ANTI-LOCKING TRACTION SLIP CONTROL

[75] Inventors: Jochen Burgdorf, Offenbach-Rumpenheim; Hans D. Reinartz, Frankfurt am Main; Helmut Steffes, Hattersheim; Peter Volz, Darmstadt, all of Fed. Rep. of Germany; André Goossens, Rumst, Belgium

[73] Assignee: Alfred Teves GmbH, Frankfurt am Main, Fed. Rep. of Germany

[21] Appl. No.: 305,303

[22] Filed: Feb. 1, 1989

[30] Foreign Application Priority Data

Feb. 5, 1988 [DE] Fed. Rep. of Germany ....... 3803363

[51] Int. Cl.$^4$ ............................ B60T 8/32; B60T 8/44; B60T 11/20; B60T 13/16
[52] U.S. Cl. .................................... 303/116; 303/110; 303/119; 303/DIG. 4
[58] Field of Search ............... 303/110, 119, 116, 114, 303/113, DIG. 1–DIG. 4, 92, 100, 68, 10–12; 188/181; 180/244, 197

[56] References Cited

U.S. PATENT DOCUMENTS

| | | | |
|---|---|---|---|
| 4,509,802 | 4/1985 | Solleder et al. | 303/110 |
| 4,685,747 | 8/1987 | Belart et al. | 303/119 X |
| 4,726,630 | 2/1988 | Krohn et al. | 303/116 X |
| 4,728,156 | 3/1988 | Burgdorf et al. | 303/DIG. 4 X |
| 4,729,611 | 3/1988 | Kircher et al. | 303/116 |
| 4,743,075 | 5/1988 | Belart et al. | 303/110 X |
| 4,746,174 | 5/1988 | Buschmann | 303/110 |
| 4,750,788 | 6/1988 | Seibert et al. | 303/119 X |
| 4,753,493 | 6/1988 | Arikawa | 303/110 |
| 4,778,226 | 10/1988 | Brown | 303/110 X |
| 4,779,936 | 10/1988 | Farr | 303/116 |
| 4,783,125 | 11/1988 | Belart et al. | 303/119 X |
| 4,786,118 | 11/1988 | Burgdorf et al. | 303/110 |
| 4,787,684 | 11/1988 | Schonlau et al. | 303/116 X |
| 4,790,608 | 12/1988 | Burgdorf et al. | 303/116 X |
| 4,793,663 | 12/1988 | Ocvirk et al. | 303/110 |
| 4,796,959 | 1/1989 | Seibert et al. | 303/110 X |
| 4,804,236 | 2/1989 | Burgdorf et al. | 303/116 |
| 4,807,944 | 2/1989 | Weise | 303/110 X |

FOREIGN PATENT DOCUMENTS 2111149  6/1983  United Kingdom .
2195723  4/1988  United Kingdom .

Primary Examiner—Douglas C. Butler
Attorney, Agent, or Firm—Robert P. Seitter

[57] ABSTRACT

The brake system includes a brake pressure generator with a master cylinder connected to wheel brake cylinders through master brake conduits; auxiliary pressure pumps having pump outlets in communication with the master brake conduits and pump inputs in communication with a pressure fluid reservoir through inlet conduits; wheel sensors and electronic circuits for determining the wheel rotating pattern and for generating electrical brake pressure control signals capable of controlling pressure fluid inlet and outlet valves disposed in the conduit system for slip control. The traction slip control system insures, with little effort involved, assembling and disassembling capabilities, and, in disassembled condition, complying with the control principle for a driven front axle and, in assembled condition, complying with the traction slip control mode for a driven rear axle in all speed ranges. The present invention provides an accumulator with a single connection in communication, with the master brake conduit, with an electromagnetic valve having a pressure monitoring switch coupled thereto and provided with a bypass enclosing a release valve located between the connection and the accumulator.

6 Claims, 2 Drawing Sheets

PRESSURE FLUID-ACTIVATED BRAKE SYSTEM INCLUDING AN ANTI-LOCKING TRACTION SLIP CONTROL

BACKGROUND OF THE INVENTION

The present invention is concerned with an anti-locking pressure fluid-actuated brake system with traction slip control. A pedal-actuated, preferably auxiliary force-supported brake pressure generator includes a master cylinder connected to wheel brake cylinders through master brake conduits branching into a conduit system. Auxiliary pumps deliver to connecting lines on the master brake conduits, and draw through an inlet conduit connected to a pressure fluid reservoir. Wheel sensors and electronic circuits, for determining the wheel rotating pattern and for generating electrical brake pressure-controlling signals capable of controlling electromagnetically actuable pressure fluid inlet and outlet valves, are provided in the conduit system for slip control.

Comparable anti-locking, pressure fluid-actuated brake systems with traction slip control are disclosed in German Patents DE Nos. 31 37 286 and 31 37 287. The anti-locking system of such brake systems is based on the return flow principle. Consequently, the traction slip control system is based on the specific anti-locking system, with an accumulator integrated into the brake system with a plurality of hydraulic connections being employed.

The disadvantage involved with the afore-described brake systems resides in that no provision is made (unless substantial efforts are accepted) for assembling or disassembling capabilities respectively for high-speed and standard-speed traction slip control systems.

SUMMARY OF THE INVENTION

It is, therefore, the object of the present invention to provide traction slip control for a brake system comprising an anti-locking system based on the dynamic inflow principle permitting assembly and disassembly of a small number of connections for high-speed and normal-speed anti-traction slip control, respectively.

The problem, according to the present invention, is solved by connecting a single connection from an accumulator to the main brake conduit. An electromagnetic valve is provided in the connecting line with a pressure monitoring switch between the valve and the accumulator. A bypass is furnished around the valve with a release valve located between the connection and the accumulator.

An advantageous embodiment of the invention connects the accumulator to the master brake conduit for the actuated wheels, where the actuated wheels are the rear wheels.

Another advantageous embodiment of the invention provides an electromagnetic valve inserted into the main brake conduit between the master cylinder and the pump outlet terminating thereinto. The electromagnetic valve is provided with a double bypass, one bypass having a release valve and another bypass having a check valve.

A further advantageous embodiment of the invention combines the valves located between the accumulator and the connection thereof to the pump outlet, with a bypass and pressure monitoring switch, to form a block with short functional connections.

In addition, another advantageous embodiment provides a plurality of master brake conduits and pump outlets, respectively, each having a connected accumulator furnished with a valve, a bypass and a pressure monitoring switch.

The advantages conveyed by the invention reside in that a brake system provided with anti-locking control and standard-speed traction slip control can be extended, by adding a small unit, to high-speed control, and that this is achievable by a relatively simple mounting step thereby enabling traction slip control designed for front wheel drive to be employed for rear axle drive of high-performance vehicles in all speed ranges.

BRIEF DESCRIPTION OF THE DRAWING

The invention will now be explained with reference to one embodiment of a brake system with an extended traction slip control system (TSC) limited to the actuated rear axle, as illustrated in FIG. 1 of the drawing. An alternative embodiment is shown in FIG. 2.

DETAILED DESCRIPTION OF THE PREFERRED EMBODIMENT

Figure 1:
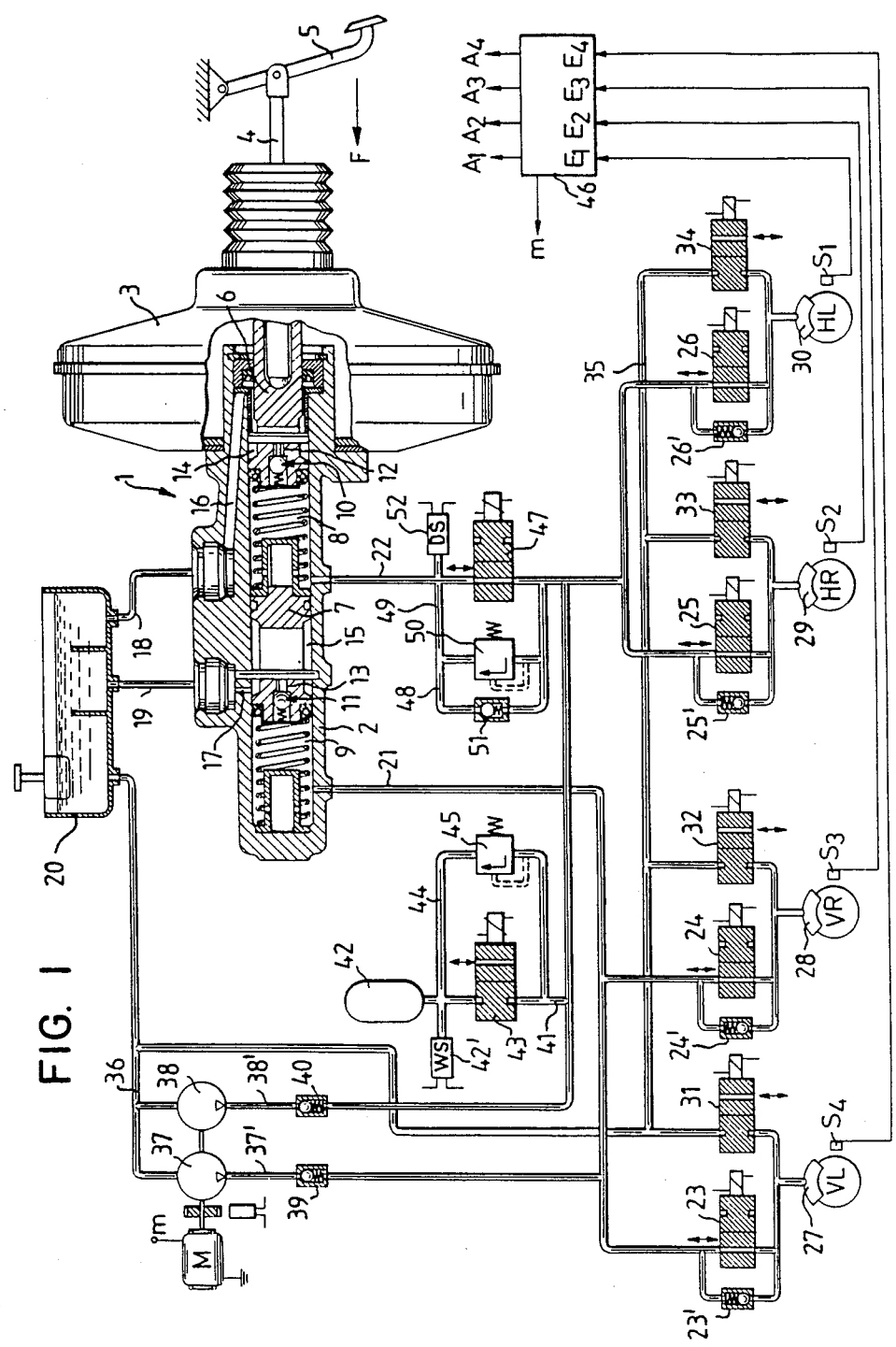

The brake system includes a hydraulic aggregate formed of the brake pressure generator 1 having a tandem master cylinder 2 and a vacuum booster 3 coupled thereto. A pedal force F exerted on a brake pedal 5 is transferred to the vacuum booster 3 through a pushrod 4. The force F is transferred from the booster 3, in a manner supported by auxiliary force, to the master piston 6, 7 of the tandem master cylinder 2. In the release position of the brake as shown, the pressure chambers 8, 9 of the master cylinder 2 are in communication with a pressure fluid reservoir 20 through opened central control valves 10, 11; connecting channels 12, 13 in the interior of the pistons 6, 7; pressure chambers 14, 15; connecting ports 16, 17; and through hydraulic conduits 18, 19. Two master brake conduits 21, 22 of the master cylinder are in communication with wheel brake cylinders 27, 28, 29, 30, through electromagnetically actuable SO-valves operating as inlet valves 23, 24, 25, 26 which are shown in the normally open position. The wheel brake cylinders 27, 28, 29, 30, moreover, are in communication with electromagnetically actuable SG-valves acting as outlet valves which are shown in the normal blocked or closed position. The SG-valves, through a hydraulic return-flow conduit 35, are in communication with an outlet conduit 36 of the pressure fluid reservoir 20. The outlet conduit 36, at the same time, is an inlet conduit 36 of hydraulic pumps 37, 38. The pumps are actuated by electromotive force and are provided with pump outputs 37', 38'. The pump outputs 37', 38', through check valves 39, 40, lead into the master brake conduits 21, 22.

Provided on the pump outlet 38', between check valve 40 and master brake conduit 22, is a connection 41 for an accumulator 42 with an associated pressure monitoring switch 42'. Connected between the connection 41 and the accumulator 42 is an electromagnetically actuable SG-valve 43 containing bypass 44 with release valve 45. The pressure monitoring switch 42', upon occurrence of a minimum and a maximum pressure, respectively, in the accumulator 42, provides signals to an electronic signal processing circuit 46 turning on and off the pump motor M for loading the accumulator 42 and for terminating the loading process, respectively. The release valve 45 will limit the maximum pressure in the accumulator 42 and is provided for conditions caused by thermal excess pressure. Located in the master brake conduit 22 of the rear axle, between the discharge of the pump outlet 38' and the pressure chamber 8, is an electromagnetically actuable SO-valve 47 provided with a dual bypass 48, 49 having a release valve 50 in one branch, a check valve 51 in another branch, and with pressure switch 52 coupled thereto. The pressure switch 52, through circuit 46, is connected to the pump motor M and the pressure monitoring switch 42', causing discontinuation of the loading or pressurizing mode of the accumulator upon applying the brake and upon a pressure build-up in the pressure chamber 8, such that the pump motor M is turned off even when a pressure demand for the accumulator 42, as indicated by the pressure monitoring switch 42', occurs.

The use of accumulator 42 will reduce the response time of the traction slip control systems, as compared with conventional systems operating without an accumulator, to $\leq 20$ ms, causing the excellent aptitude thereof for use with high-performance automotive vehicles with rear axle drive.

Figure 2:
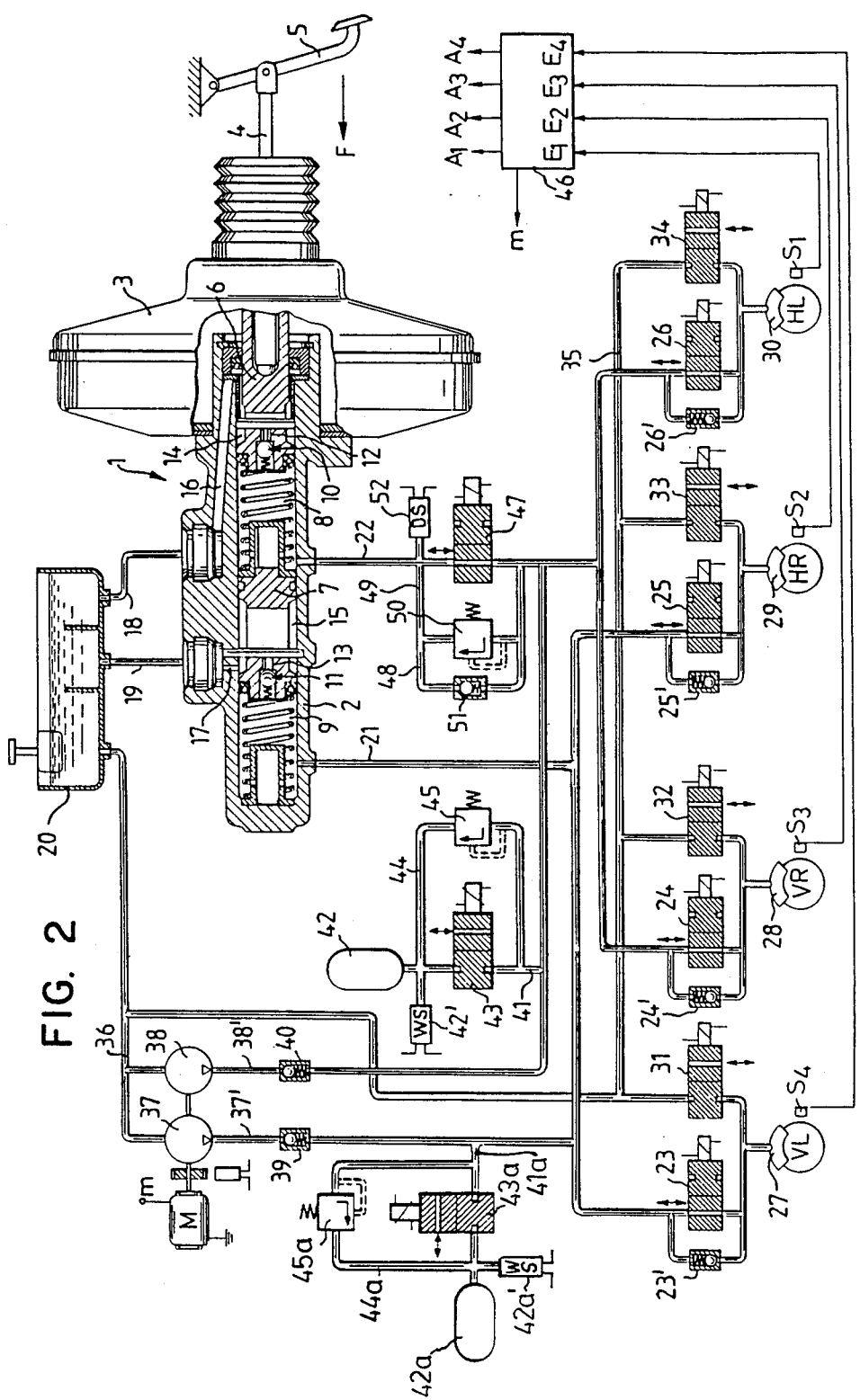

Provision of the accumulator 42 in multiple arrangement is suitable in the event that high-speed traction slip control of a plurality of brake circuits is required and for front and rear axle drive in a diagonal arrangement of the brake circuits, respectively. A multiple accumulator arrangement is illustrated in FIG. 2.

The vehicle wheels are furnished with inductive sensors S1 through S4 generating electrical signals thereby identifying the wheel rotating speed and changes therein, respectively. The signals will be supplied to the electronic signal processing and logical circuit 46. The circuit 46 generates brake pressure control signals, which in the case of a locking tendency of one or several wheels, subjects the associated inlet and outlet valves 23-26 and 31-34 to pulsating or temporary changeover thereby keeping constant, decreasing and, in the case of cessation of the locking tendency, re-increasing the brake pressure. Through outputs A1 through A4, actuating magnets of the inlet and outlet valves are driven via electrical conduits and connections, respectively (not shown).

The circuit 46, in known per se manner, is realizable by hardware-implemented circuits or through programmable electronic modules, such as micro-computers or micro-controllers.

The switch-on signal for operating the driving motor M of the hydraulic pumps 37, 38, which is required to be operative during a slip control, is applied to the motor M through the connection m.

With the brake applied, pedal force F—supported by the vacuum in the booster 3—is transferred to the master cylinder pistons 6, 7. The center control valves 10, 11 close thereby enabling brake pressure to build up in the pressure chambers 8, 9 and, in the master brake conduits 21, 22. The brake pressure, through valves 23 to 26, is fed to the wheel brake cylinders 27 through 30.

When, during the decelerating process, a locking tendency is detected on one or several wheels by sensors S1 through S4 and circuit 46, the anti-locking control will commence. In response to a signal provided by circuit 46, the corresponding inlet valves 23 through 26 associated with the wheel tending to lock, are switched into the blocking or closed position, thereby hydraulically separating the corresponding wheel brake cylinders 27 through 30 from the master brake conduits. The signal provided by circuit 46, at the same time, will turn on the pump motor M, whereupon pressure is built up in the pump outlets 37', 38', in the master brake conduits 21, 22 and in the pressure chambers 8, 9 down to the inlet valves 23 through 26. The volume build-up and pressure build-up, respectively, in the pressure chambers 8, 9 will move the working pistons 6, 7 against the pedal force F until the zero position thereof has been reached and in which position the central valves 10, 11 open. Additional pressure fluid, in that position, will be fed, through the central control valves 10, 11 into the pressure fluid reservoir 20.

Evacuating the pressure chambers 8, 9 is precluded in the anti-locking control mode, thereby securing a required spare volume in chambers 8, 9. Accordingly, after a temporary pressure decrease on the wheel brake cylinders concerned, an immediate re-increase in pressure in the wheel brake cylinders will be permitted by opening the associated inlet valves.

When a traction slip tendency is detected, during driving, on one wheel or on both wheels of the driving axle with the aid of sensors S1 through S4 and circuit 46, the traction slip control will commence. In response to a signal provided by circuit 46, the inlet valve 25 or 26 not associated with the slip tendency, and the SO-valve 47 will be closed, while the SG valve 43 of the accumulator 42 will be opened. Pressure fluid is fed into the two master brake conduits 21, 22 from the accumulator 42 and from the pumps 37, 38 simultaneously turned on, thereby permitting rapid deceleration of one wheel or both wheels of the automotive vehicle. The SO-valve 47 prevents a pressure decrease through the central control valve 10. With the master brake conduit 21 being non-pressurized, traction slip control will not be possible for the non-driven wheels. A pressure decrease necessarily occurs through the central control valve 11 for the flow of volume generated by pump 37, since no traction slip control is provided for the non-driven wheels of the wheel brake cylinders 27, 28.

While certain embodiments of the invention have been described in detail above, it will be apparent to those skilled in the art that the disclosed embodiment may be modified. Therefore, the foregoing description is to be considered exemplary rather than limiting, and the true scope of the invention is that defined in the following claims.

What is claimed is:

1. An anti-locking, pressure fluid-actuated brake system including traction slip control, comprising a pedal-operated, auxiliary force-supported brake pressure generator including a master cylinder connected to wheel brake cylinders through master brake conduits branching into a conduit system, auxiliary pressure pumps having pump outlets in communication with the master brake conduits and pump inlets in communication with a pressure fluid reservoir through an inlet conduit, wheel sensors for determining wheel rotating patterns, electronic circuits for generating electrical brake pressure control signals capable of controlling electromagnetically actuable pressure fluid inlet and outlet valves in the conduit system for slip control, an accumulator having a single connection in communication with at least one of the master brake conduits, and a first electromagnetic valve including a pressure monitoring switch and a bypass with a release valve disposed between the single connection and the accumulator permitting assembly and disassembly of a small number of connections for high-speed and normal-speed anti-traction slip control.

2. The brake system according to claim 1, wherein one of the master brake conduits with the single connection of the accumulator is the master brake conduit for actuated wheels.

3. The brake system according to claim 2, further comprising a second electromagnetic valve connected into one of the master brake conduits between the master cylinder and the pump outlet terminating thereinto, the electromagnetic valve having one bypass with a release valve and a check valve.

4. The brake system according to claim 2, wherein the first electromagnetic valve and the release valve disposed between the accumulator and the single connection thereof to the pump outlet of the pump are combined with the bypass and the pressure monitoring switch to form a block with short functional connections.

5. The brake system according to claim 2, wherein the actuated wheels are the rear wheels.

6. The brake system according to claim 1, further comprising said master brake conduits forming a first conduit system and a second conduit system with one connection each of an accumulator provided with an electromagnetic valve, a release valve, a bypass and a pressure monitoring switch.

* * * * *